United States Patent [19]

Carstens et al.

[11] 3,724,691

[45] Apr. 3, 1973

[54] DEVICE TO STOP AND TO CHANGE DIRECTION OF VEHICLES IN A CAPSULE-TRANSPORT PIPELINE

[75] Inventors: Marion R. Carstens, Atlanta; Homer J. Bates, Roswell, both of Ga.

[73] Assignee: Georgia Tech Research Institute, Atlanta, Ga.

[22] Filed: Oct. 28, 1971

[21] Appl. No.: 193,377

Related U.S. Application Data

[63] Continuation-in-part of Ser. Nos. 856,566, Sept. 10, 1969, abandoned, and Ser. No. 140,071, May 4, 1971.

[52] U.S. Cl. ............... 214/52 C, 104/131, 104/155, 243/31
[51] Int. Cl. ..................... B65g 67/50, B65g 51/24
[58] Field of Search ............ 214/52 C; 243/19, 31, 6; 104/130, 131, 138, 155

[56] References Cited

UNITED STATES PATENTS

| | | | |
|---|---|---|---|
| 1,813,625 | 7/1931 | Knox | 243/6 X |
| 1,883,964 | 10/1932 | Kramer | 104/131 |

Primary Examiner—Robert G. Sheridan
Attorney—Edward Taylor Newton et al.

[57] ABSTRACT

A pipeline transportation system for vehicles in which the motive force is low pressure air traveling at a velocity substantially at which the vehicles are swept along includes a first pipeline which leads to a transfer duct and a second pipeline which leads away from the transfer duct. A guiding pipeline extends beyond the transfer duct as a continuation or extension of that pipeline in which air flows into the transfer duct and an extension of the other pipeline also leads from the transfer duct, the two guide extensions having free end portions disposed in close adjacency to each other. A dead-end chamber is swingably mounted for movement between positions aligned with the respective free end portions of the two guide extensions and in the return guide extension there is an unloading station whereat the vehicle may be inverted and then righted and beyond this there is a loading station so that the vehicle can be loaded, returned to the transfer duct and then conveyed to some distant region through the other pipeline.

18 Claims, 6 Drawing Figures

PATENTED APR 3 1973 3,724,691

INVENTORS:
MARION R. CARSTENS
HOMER J. BATES

BY: Newton, Hopkins, & Ormsby
ATTORNEYS.

PATENTED APR 3 1973 3,724,691

DEVICE TO STOP AND TO CHANGE DIRECTION OF VEHICLES IN A CAPSULE-TRANSPORT PIPELINE

CROSS REFERENCE TO RELATED APPLICATIONS

This application is an improvement in the parent and continuation-in-part applications Ser. No. 856,566, filed Sept. 10, 1969, now abandoned and Ser. No. 140,071, filed May 4, 1971.

The above applications and the disclosures thereof are incorporated herein by reference.

BACKGROUND OF THE INVENTION

In the aforesaid copending continuation-in-part application, there is disclosed a transportation system which utilizes low pressure, high velocity air as the motive power for transporting vehicles through a conduit system and, in particular, a closed conduit system is disclosed and, as well, a system in which a vehicle or vehicles are shuttled back and forth within a common pipeline or conduit means.

In many cases, the transporting system usefully will be employed for transporting bulk materials which will be programmed to be directed to a predetermined point at which it may be desired to off-load the contents of the vehicle and then, perhaps, to re-load the vehicle before it is passed to the originating or to a further station. Thus, it would be desirable to provide a system having these capabilities and wherein these functions are performed in an efficacious manner.

BRIEF SUMMARY OF THE INVENTION

The present invention is primarily directed to an improved system as defined hereinabove having the aforesaid additional capabilities and functions. For this purpose, the arrangement in general comprises a conduit system having one conduit means leading to a common region and a second conduit means leading away from the common region and with the air flow creating means establishing an air flow system wherein the low pressure air flows to the common region through one of the conduit means and flows away from the common region through the other of the conduit means and with there being provided means for extending the first conduit means at the common region beyond the environment of the air flow system and second means for extending the second conduit means at the common region beyond the environment of the air flow system and, as well, means for directing the vehicle from the first to the second extension means.

Preferably, there is provided a transfer means in the form of a duct or the like interconnecting the two conduit means at the common region, the two conduit means being open within the duct or transfer means so as to allow the motive-providing air stream to pass from one conduit means to the other and so that extensions of these two conduit means beyond the transfer means are essentially beyond the environment of the air flow system and whereat the diverting, unloading and re-loading may take place free from the influence of the low pressure air flow system.

The diverting means which directs the vehicle from one extension to the other so that eventual transfer from one conduit means to the other is effected, preferably takes the form of a dead-end chamber which is swingably mounted for movement between respective positions in alignment with the conduit means extensions which are essentially outside the environment or influence of the air flow system. The unloading station is a section of the return extension which is effective to invert and then right a vehicle residing therein and, downstream from this section, there is a further section which is open at its top to allow re-loading of the vehicle, prior to the reintroduction into the environment or influence of the air flow system.

BRIEF DESCRIPTION OF THE DRAWING FIGURES

DETAILED DESCRIPTION OF THE INVENTION

Figure 1:
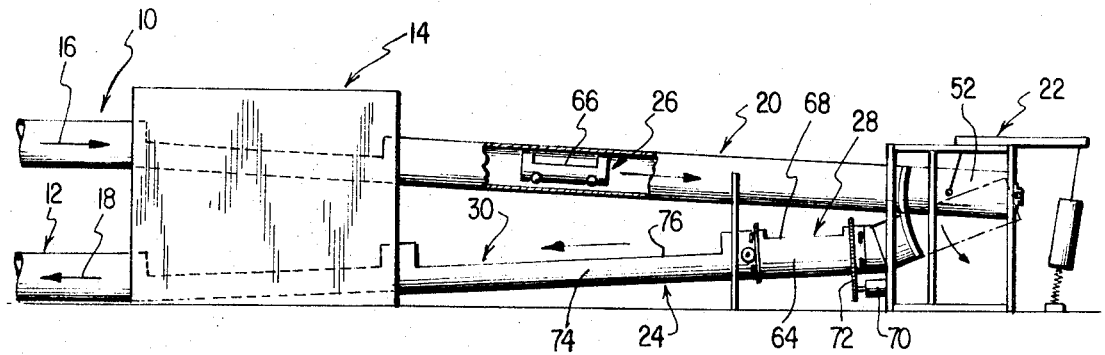
FIG. 1 is a view in elevation, partially broken away, illustrating the first and second conduit means and the various components at the common region whereat the functional aspects of the present invention take place.

Reference to FIG. 1 will illustrate the general arrangement and combination of components according to a preferred embodiment of the present invention. As shown therein, there is provided a first conduit means indicated generally by the reference character 10 and a second conduit means indicated generally by the reference character 12, which both are associated with a transfer means indicated generally by the reference character 14. Means is provided in association with the two conduit means 10 and 12 and the transfer means 14 such as to create a low pressure air flow system which is operative to provide the motive force for propelling or sweeping along the vehicle or vehicles in the system. In FIG. 1, the arrow 16 indicates the direction of air flow in the first conduit means 14 which is leading to the transfer means 14 and the arrow 18 in the second conduit means 12 illustrates the direction of air flow leading away from the transfer means 14.

The first and second conduit means 10 and 12 emanate from a distance, and in this respect may emanate from a common region distant to the common region illustrated in FIG. 1 or they may lead to different stations which form part of the overall transportation system.

Beyond the transfer means 14, there is provided a first guide or extension means 20 leading away from the transfer means 14 towards a diverting station 22 and there is also provided a second guide or extension means 24 leading from the diverting station 22 to the transfer means 14. As will hereinafter be disclosed in detail, the vehicle 26, in passing through the extension means 20, the diverting station 22 and the returning extension means 24 is essentially beyond the environment or influence of the air flow system and the arrangement is thus eminently suitable to perform the stopping, diverting, unloading and re-loading of the vehicle as hereinafter described without interfering with the motivating air flow system or being interfered thereby.

To complete the general description of FIG. 1, the return extension means 24 includes an unloading station indicated generally by the reference character 28 and a re-loading station indicated generally by the reference character 30.

Figure 2:
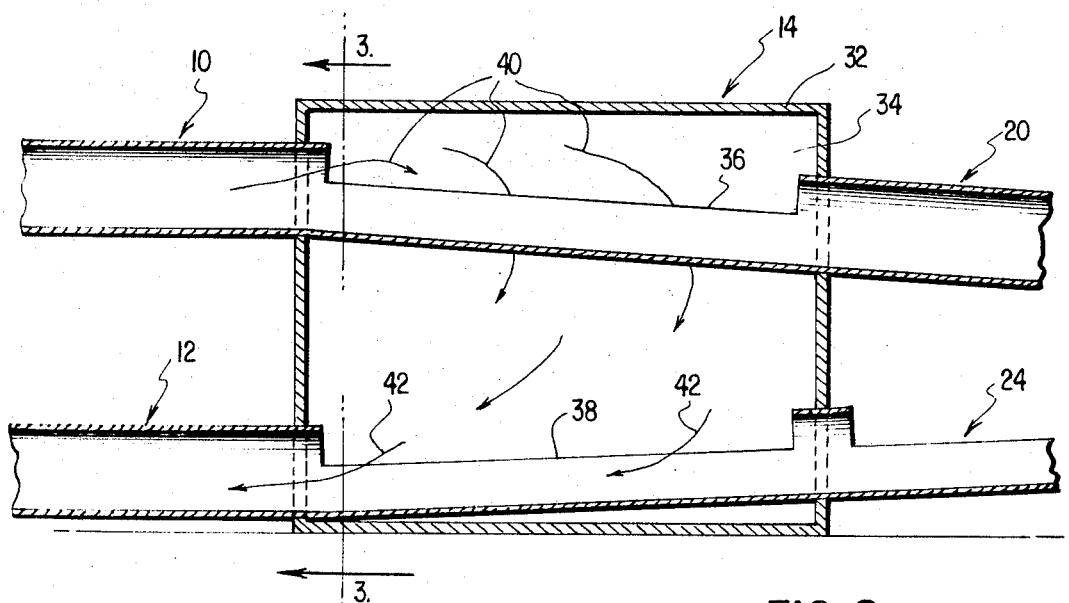
FIG. 2 is an enlarged vertical section taken through the system at the transfer means.
Figure 3:
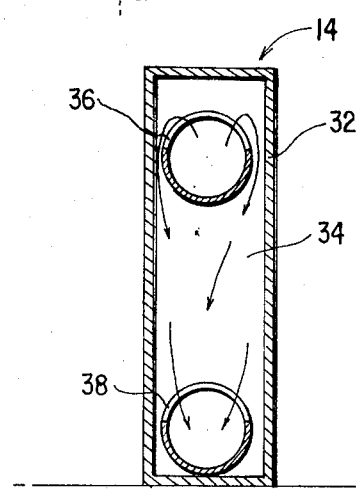
FIG. 3 is a transverse section taken substantially along the plane of section line 3—3 in FIG. 2 and showing further details of the transfer means.

Referring now to FIGS. 2 and 3, the transfer means 14 will be seen to consist of walled enclosure 32 presenting a transfer duct interior 34 within the confines of which the first and second conduit means 10 and 12 are provided with top openings or cut-aways 36 and 38 respectively which allow the air flowing in the first conduit means 10 toward the transfer means 14 to flow outwardly of the first conduit means in the manner indicated by the arrows 40 and to pass therefrom, through the interior 34 into the second conduit means 12 as indicated by the arrows 42. The transfer means, then, acts as a "turnaround" for the air flowing in the propelling or motive system and effectively isolates or substantially isolates the two extensions 20 and 24 from the environment or influence of the air flow system. To this end, the blower mechanism (not shown) used for creating the air flow system may be so located with respect to the transfer means 14 that the interior thereof is substantially at atmospheric pressure as is disclosed in the applications mentioned hereinabove and incorporated herein by reference. Other arrangements may, of course, be used as desired.

Figure 4:
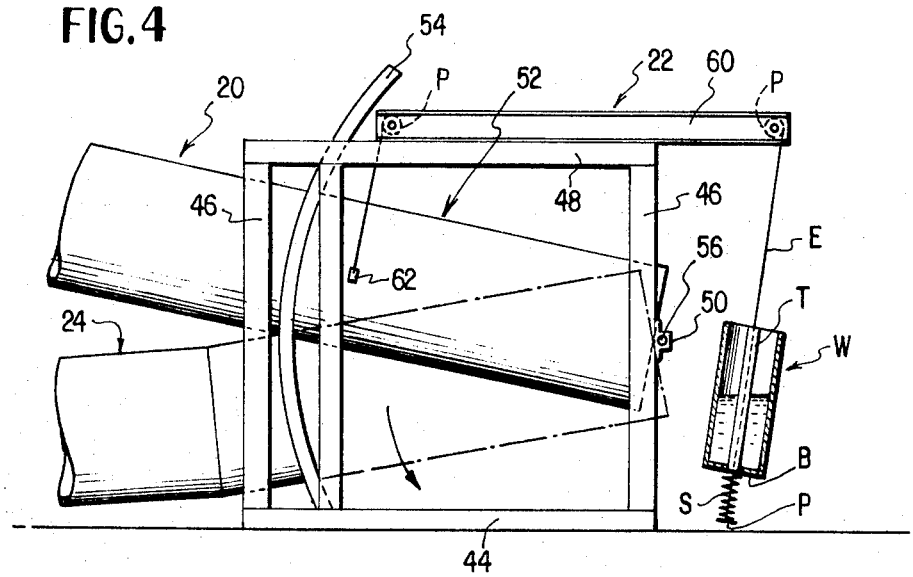
FIG. 4 is an enlarged elevational view showing the diverting station.
Figure 5:
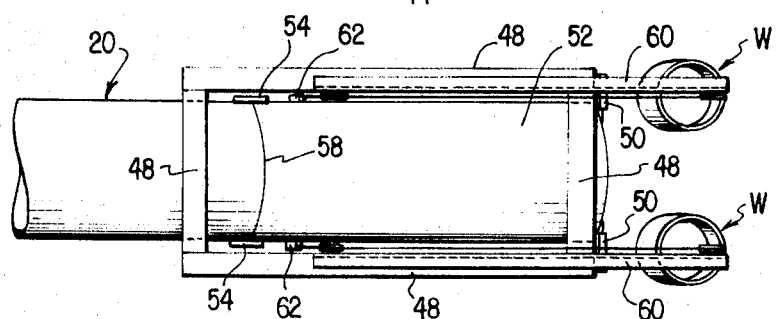
FIG. 5 is a plan view of the assembly shown in FIG. 4.

At the diverting station 22, the arrangement of FIGS. 4 and 5 is provided for the purpose of transferring or diverting the vehicle 26 from one extension means 20 to the other 24. For this purpose there is provided at the station 22 a framework which may include a base or base members 44 and several uprights such as are indicated by the reference characters 46 and suitable interconnecting members 48 to provide a rigid frame mounting the pivot block 50 by means of which a dead-end chamber 52 is swivelly connected for movement between the full and dashed line positions illustrated in FIG. 4. The framework also supports a pair of guide members 54 which straddle the forward or free end of the dead-end chamber 52 and which guides are arcuately concentric with the pivot axis of the shaft or shafts 56 which swingably or swivelly connect the dead-end chamber 52 to the framework through the intermediary of the blocks 50 previously described. The forward end of the dead-end chamber 52 is cut on an arc and the free end portions of the two extension means 20 and 24 are vertically aligned and also cut on arcs concentric with the axis of the shaft 56 so that the free end of the chamber 52 is in closely spaced relationship with the end of the either the extension 20 or the extension 24, as the case may be, as is indicated at 58 in FIG. 5.

Normally, the dead-end chamber 52 is counterweighted to assume the full line position as is shown in FIG. 4 and for this purpose, a pair of weights W are provided to counterbalance same. Each of the weights W is in the form of a cannister having a central tube T projecting therein as is shown in FIG. 4 and through which one end of an operating cable C is passed for dead-ending upon a plate P between which plate and the bottom B of each cannister there is interposed a damping spring S. The cable C in each case is passed over a pair of pulleys P supported by the arms 60 which are secured to and rigid with the frame and the opposite ends of the cables C and dead-ended as at 62 to the opposite sides of the dead-end chamber 52. The two cannisters are filled to a greater or lesser extent with a suitable material such as water to provide the proper counterbalancing weight so that when the loaded vehicle 26 enters the dead-end chamber 52, the chamber will slowly swing down to the dashed line position shown in FIG. 4 wherein it is in alignment with the guide means 24 so as to allow the vehicle to flow or roll by gravity into the return extension 24.

Returning to FIG. 1, it will be noted that the extension means 20 is slightly downwardly inclined toward the diverting station 22 so that the loaded vehicle may roll by gravity slowly after it has passed beyond the confines of the transfer means 14 eventually to enter the dead-end chamber 52. The dead-end chamber may be constructed so as to provide a progressively narrowing cross section to afford a cushioning effect of air being compressed ahead of the entering vehicle 26 and additionally, the dead-end chamber may be provided with a suitable bumper or cushion at its closed, right-hand end in FIG. 1 finally to arrest the motion of the loaded vehicle 26. It is also to be understood that any suitable latching means may be provided within the confines of the dead-end chamber 52 to retain the loaded vehicle 26 therewithin, until released, as the dead-end chamber swings from the full to the dashed line positions of FIG. 4. Assuming now that the dead-end chamber, with the loaded vehicle therewithin, has swung down to the dashed line position in FIG. 4, and that the suitable retaining or latching means has been released, the loaded car will now roll by gravity into the confines of the return guide means 24 and, specifically into that section 64 thereof which constitutes the unloading section of the return guide means 24. Thereafter, the dead-end chamber 52 will return to its full line position shown in FIGS. 1 and 4. Once in the unloading section 64, suitable stop and holding means retain the vehicle therewithin such that the open top 66 of the vehicle is in registry with the opening 68 of the section 64 which normally is disposed uppermost as is illustrated in FIG. 1. Thereafter, a suitable drive means such as the electric motor 70 operating through a chain 72 sprocketed to trained over the section 64 rotates the section 64 through 360° first to invert the car within the section 64 and dump its contents and thereafter to right the car or vehicle whereafter the holding means may be released so that the vehicle, now unloaded, may pass by gravity down the inclined return guide means 24 into the re-loading section 74. This section 74 is provided with a cut away or opening 76 in its upper side, as shown, whereby the now-upright vehicle may be re-loaded with material which is to be sent to a distant station through the second conduit means 12. It is to be understood that suitable arresting and holding means may be provided in the section 74 constituting the re-loading station 30 whereby to hold the vehicle for re-loading and later to release at the proper time for reentry into the transfer means 14 ultimately to return to the influence or the environment of the air flow system for progress through the conduit means 12.

Figure 6:
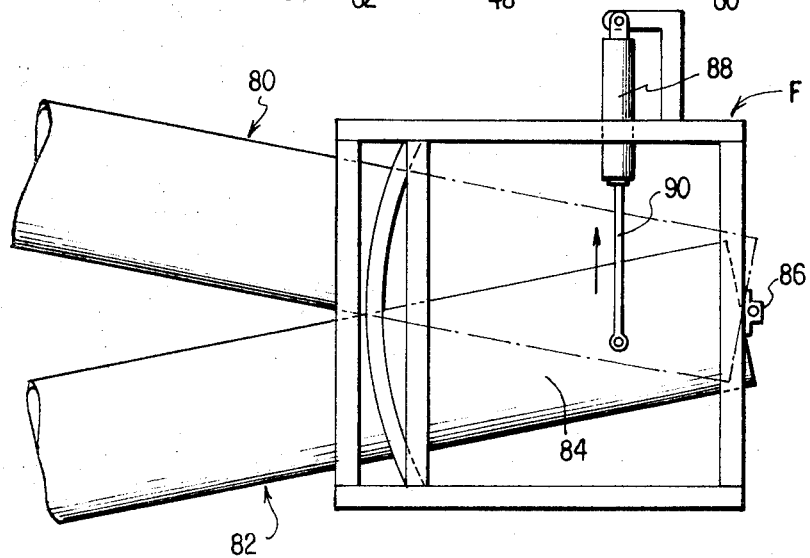
FIG. 6 is a plan view showing a modification of the invention.

In the embodiment of the invention shown in FIG. 6, the extension means or guide means 20 and 24 of FIG. 1 have been replaced by equivalent means 80 and 82 which, instead of being vertically staggered at their free end portions as in FIG. 1, are disposed in horizontally staggered relationship as is shown in FIG. 6. The dead-end chamber 84, in this case, is swingably supported through pivot blocks 86 for movement about a vertical axis between the full and dashed line positions illustrated in FIG. 6. Since the operation of the device now will not take place under the influence of gravity, a suitable cylinder 88 and associated piston rod 90 interconnects the frame F and the dead-end chamber 84 positively to effect the swinging action of the latter.

What is claimed is:

1. In a transportation system of the type including first and second conduit means emanating from a distance and leading to a common region, and including means for creating a low pressure air flow system through said first conduit means toward said common region and through said second conduit means away from said common region, the improvement comprising:

transfer means communicating said first and second conduit means for receiving air from said first conduit means and passing it to said second conduit means at said common region;

at least one transporting vehicle operating in said system and adapted to be swept along by low pressure air flow therein;

first guide means extending from said transfer means for receiving said vehicle from said first conduit means and guiding it along a first path essentially beyond the environment of the air flow system;

second guide means leading to said transfer means for guiding said vehicle along a second path to said second conduit means leading to the environment of said air flow system;

said first and second paths being arranged to have corresponding free ends disposed in closely spaced relation; and diverting means for receiving said vehicle at said free end of the first path and delivering it to said free end of the second path whereby said vehicle may progress to said common region through said first conduit means within the environment of said air flow system ultimately to be reintroduced into said air flow system for passage through said second conduit means.

2. In a transporting system as defined in claim 1 wherein said diverting means comprises a dead-end chamber.

3. In a transportation system as defined in claim 2 wherein said dead-end chamber is swingably mounted for movement between positions aligned respectively with said first guide means and said second guide means.

4. In a transportation system as defined in claim 3 wherein said first and second guide means are vertically staggered at said free end portions of the first and second paths.

5. In a transportation system as defined in claim 3 wherein said first and second guide means are horizontally staggered at said free end portions of said first and second paths.

6. In a transportation system as defined in claim 1 wherein said second guide means includes an unloading section for said vehicle prior to its introduction into said second conduit means.

7. In a transportation system as defined in claim 6 wherein said second guide means includes a loading section beyond said unloading section.

8. In a transportation system of the type including first and second conduit means emanating from a distance and leading to a common region, and including means for creating a low pressure air flow system through said first conduit means toward said common region and through said second conduit means away from said common region, the improvement comprising:

at least one transporting vehicle operating in said system and adapted to be swept along by low pressure air flow therein;

first means for extending said first conduit means at said common region beyond the environment of said air flow system;

second means for extending said second conduit means at said common region beyond the environment of said air flow system; and means for directing said vehicle from said first means to said second means.

9. In the transportation system as defined in claim 8 wherein said second means includes an unloading section for said vehicle.

10. In the transportation system as defined in claim 9 wherein said second means also includes a loading section beyond said unloading section.

11. In a transportation system as defined in claim 8 wherein the last-mentioned means comprises a dead-end chamber.

12. In a transportation system as defined in claim 11 wherein said dead-end chamber is swingably mounted for movement between positions aligned respectively with said first and second means.

13. In a transportation system as defined in claim 12 wherein said first and second means are vertically staggered adjacent said dead-end chamber.

14. In a transportation system as defined in claim 12 wherein said first and second means are horizontally staggered adjacent said dead-end chamber.

15. In a transportation system of the type including first and second conduit means emanating from a distance and leading to a common region, and including means for creating a low pressure air flow system through said first conduit means toward said common region and through said second conduit means away from said common region, the improvement comprising:

transfer means communicating said first and second conduit means for receiving air from said first conduit means and passing it to said second conduit means at said common region;

at least one transporting vehicle operating in said system and adapted to be swept along by low pressure air flow therein;

first guide means for leading said vehicle away from said transfer means by gravity after discharge thereinto from said first conduit means;

second guide means for leading said vehicle to said transfer means by gravity and to said second conduit means;

said first and second guide means having closely spaced free end portions remote from said transfer means; and means for receiving said vehicle from the free end portion of said first guide means and transferring it to the free end portion of said second guide means.

16. In the transportation system as defined by claim 15 wherein the last-mentioned means is a dead-end chamber.

17. In the transportation system as defined in claim 16 wherein said dead-end chamber is swingable by gravity to effect said transfer.

18. In the transportation system as defined in claim 16 wherein said dead-end chamber is swingable horizontally to effect said transfer, and means for swinging said dead-end chamber horizontally.

* * * * *